US006318783B1

(12) United States Patent
Knox

(10) Patent No.: US 6,318,783 B1
(45) Date of Patent: Nov. 20, 2001

(54) STRUCTURE FOR CONNECTING AUTOMOTIVE INTERIOR TRIM SKIN PORTIONS

(75) Inventor: Jonathan P. Knox, Rochester, NH (US)

(73) Assignee: Textron Automotive Company, Inc., Troy, MI (US)

(*) Notice: Subject to any disclaimer, the term of this patent is extended or adjusted under 35 U.S.C. 154(b) by 0 days.

(21) Appl. No.: 09/577,742

(22) Filed: May 23, 2000

(51) Int. Cl.⁷ .............................. B60R 13/02; B68G 7/12
(52) U.S. Cl. ...................... 296/39.1; 296/146.7; 29/91
(58) Field of Search ..................... 296/39.1, 146.7; 29/91, 91.1, 91.7

(56) References Cited

U.S. PATENT DOCUMENTS

| 4,229,036 | * | 10/1980 | Toda ........................ 296/202 |
| 4,562,025 | | 12/1985 | Gray . |
| 4,610,620 | | 9/1986 | Gray . |
| 4,780,345 | | 10/1988 | Gray . |
| 4,893,833 | | 1/1990 | DiSalvo et al. ............... 280/732 |
| 4,925,151 | | 5/1990 | Gray . |
| 5,219,177 | | 6/1993 | Wang ........................ 280/728 |
| 5,297,842 | * | 3/1994 | Hayashi .................... 296/146.7 |
| 5,320,381 | | 6/1994 | Barnes et al. ................. 280/728 |
| 5,398,959 | | 3/1995 | Avila ........................ 280/728 |
| 5,401,355 | | 3/1995 | Stiller . |
| 5,419,602 | * | 5/1995 | VanHoose .................... 296/39.1 |
| 5,478,107 | | 12/1995 | Yamagishi et al. ............. 280/728 |
| 5,624,523 | | 4/1997 | Stiller . |
| 5,705,005 | | 1/1998 | Ash . |
| 6,017,074 | * | 1/2000 | Biskup ...................... 296/39.1 |
| 6,042,139 | | 3/2000 | Knox ........................ 280/728 |
| 6,073,990 | * | 6/2000 | Sauve ....................... 296/146.7 |
| 6,158,796 | * | 12/2000 | Weber ....................... 296/39.1 |

FOREIGN PATENT DOCUMENTS

405286395A * 11/1993 (JP) .................. 296/146.7

* cited by examiner

*Primary Examiner*—Joseph D. Pape
*Assistant Examiner*—Greg Blankenship
(74) *Attorney, Agent, or Firm*—Hayes, Soloway, Hennessey, Grossman & Hage P.C.

(57) ABSTRACT

A skin for an automotive interior trim panel is provided comprising a first skin portion and a second skin portion. First skin portion comprises a receptacle and a second skin portion comprises a protrusion. When connected, a portion of the protrusion in mechanical engagement with a portion of the receptacle to join the first skin portion and the second skin portion.

12 Claims, 3 Drawing Sheets

_US 6,318,783 B1_

STRUCTURE FOR CONNECTING AUTOMOTIVE INTERIOR TRIM SKIN PORTIONS

FIELD OF THE INVENTION

The present invention relates to an automotive interior trim panel having multiple skin portions and, more particularly, a structure for connecting the portions.

BACKGROUND OF THE INVENTION

The manufacture of automotive interior trim panels is well known in the art. Typically, the panels are comprised of an outer skin, a substrate, and a polyurethane foam layer sandwiched between the outer skin and the substrate. Because the outer skin is visible to the consumer, it must be aesthetically pleasing. One method for increasing the attractiveness of such panels is the use of outer skins having different colors, textures or materials in different areas of the panel.

Several techniques for producing automotive trim panels with a varying outer skin in different areas of the panel, whether it be multiple colors, textures or materials, are known in the art. U.S. Pat. No. 5,705,005 recites a method that bonds together two trim coverstock segments having different colors, gauges or textures and two rigid substrate components into a single trim panel with the two coverstock segments meeting along a finished joint line. The method includes joining the coverstock segments together to form a rough seam, supporting the substrate components on two spaced-apart movable mold components with each substrate component having a mating flange that extends into the space between the mold components, applying an adhesive layer to the substrate upper surfaces, heating the joined coverstock segments and vacuum or positive air pressure forming them across the substrate upper surfaces with the rough seam lying midway between the spaced-apart mold components. Pressure is then applied along the rough seam to infold the coverstock between the mold components while moving the mold components toward a clamped position that sandwiches the infolded coverstock portion between the substrate mating flanges and fastens them together with a pre-mounted fastener. The method forms a finished styling line between the dissimilar coverstock segments and hides the rough seam.

A second general method for forming multi-colored trim panels is disclosed in U.S. Pat. Nos. 4,562,025 and 4,610,620. These patents disclose methods for forming multi-colored, single-piece outer skins by powder casting different colored outer shell segments against different regions of a mold surface.

The third general method for forming multi-colored panels is disclosed in U.S. Pat. Nos. 5,624,523 and 5,401,355. These patents disclose a method in which the individual outer skin segments are thermoformed such that they contain a flange along the periphery of the segment. The segments are subsequently joined together by clamping under heat to form a pressed seam along the flange of the segment.

In light of the art, what is needed is a mechanical structure for joining multiple outer skin portions after the outer skin portions have been formed.

SUMMARY OF THE INVENTION

According to the present invention, a skin for an automotive interior trim panel is provided comprising a first skin portion and a second skin portion. First skin portion comprises a receptacle and a second skin portion comprises a protrusion. When connected, a portion of the protrusion is in mechanical engagement with a portion of the receptacle to join the first skin portion and the second skin portion.

DESCRIPTION OF THE INVENTION

Figure 1:
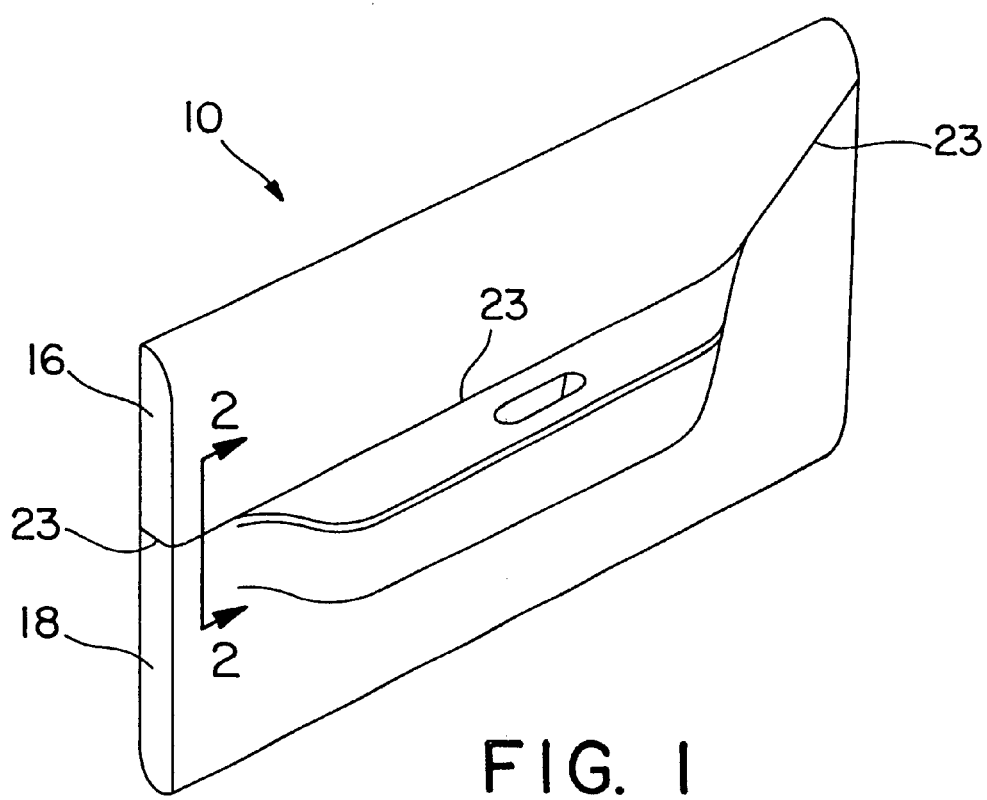
FIG. 1 is a perspective view of a trim panel according to the present invention.
Figure 2:
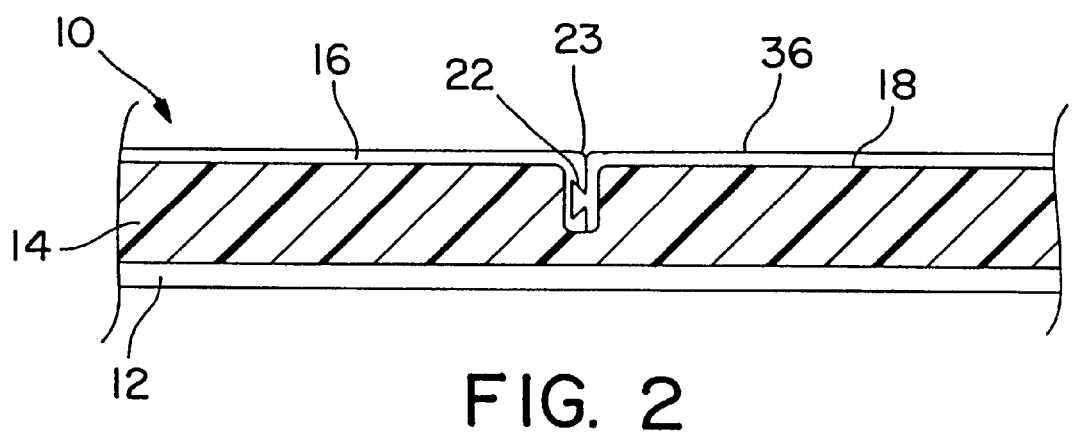
FIG. 2 is a partial cross-sectional view of the trim panel of FIG. 1 taken along section line 2—2.

An exemplary automotive interior trim panel 10 is shown in FIG. 1. As shown, interior trim panel 10 comprises a door trim panel. As shown in FIG. 2, the trim panel 10 comprises a substrate 12, a layer of polyurethane foam 14, a first outer skin portion 16 and a second outer skin portion 18. The first skin portion 16 and the second skin portion 18 are connected together by an interlocking joint 22 which extends across the outer surface of the panel 10 to form joint line 23. Interlocking joint 22 comprises a protrusion 24 and a receptacle 26 in FIG. 3. Protrusion 24 comprises a narrow portion 28 and a shoulder 30. Receptacle 26 comprises a receptacle opening 32 and an recess 34. A portion of recess 34 is wider than receptacle opening 32 and consequently is undercut as created by shoulder 33. When protrusion 24 and receptacle 26 are joined, shoulder 30 of protrusion 24 exists in the undercut portion of recess 34 of receptacle 26, and narrow portion 28 of protrusion 24 exists in receptacle opening 32 of receptacle 26. As a result, protrusion 24 is in mechanical engagement (i.e. mechanically restricted from free separation) with receptacle 26. The mechanical engagement is preferably created by an interference fit (i.e. a fit where one of the connecting parts of an assembly occupies a space provided by the other part in such a way that an overlap is achieved). The interference fit is created between the shoulder 30 of protrusion 24 and shoulder 33 of the receptacle 26.

Figure 3:
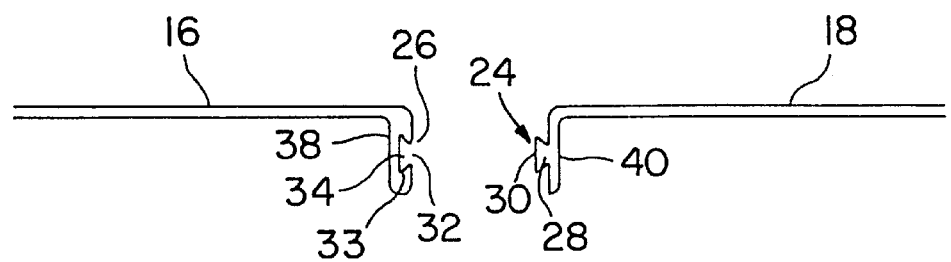
FIG. 3 is a partial cross-sectional view of two skin portions prior to forming the connecting structure according to the present invention.

Preferably, protrusion 24 is a flared tenon and receptacle 26 is an undercut mortise resulting in a dovetail joint as shown in FIG. 2. When assembled, the dovetail profile provides a connection between the first skin portion 16 and the second skin portion 18, and the interlocking joint 22 is concealed from the outer surface 36 of the trim panel 10. As shown in FIG. 3, the receptacle 26 and the protrusion 24 are preferably disposed on flanges 38, 40 along the edge of the skin portions 16, 18 and extend substantially perpendicular away from the outer surface 36 into foam 14 towards substrate 12. Also preferably, the joint 22 is continuous along the entire length of the mating edge portions of the skin portions 16, 18.

As also can be seen in FIG. 2, the substrate 12 is configured with extended thickness at 12a to maintain a relatively constant thickness for foam layer 14 opposite interlocking joint 22.

Figure 4:
FIG. 4 is a partial cross-sectional view of a first alternative connecting structure according to the present invention.
Figure 5:
FIG. 5 is a partial cross-sectional view of a second alternative connecting structure according to the present invention.

As one skilled in the art will appreciate, there are numerous other possible joint designs which may be employed to join the skin portions together in keeping with the principle of the present invention. For example, in other embodiments as shown in FIG. 4, protrusion 24 and receptacle 26 may be disposed substantially parallel to outer surface 36 of the trim panel 10. In other embodiments as shown in FIG. 5, protrusion 24 may comprise a bead and receptacle 26 may comprise a socket. In other embodiments, joint 22 may be employed intermittently along the mating edge of the skin portions 16, 18.

Figure 6:
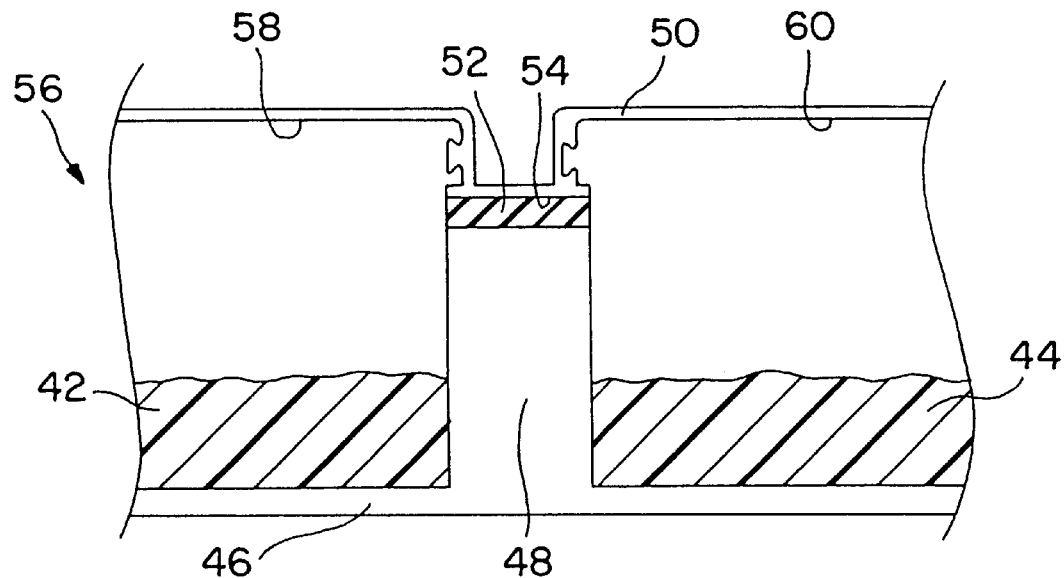
FIG. 6 is a partial cross-sectional view of a shell mold for producing the skin portions according to the present invention.

First skin portion 16 and second skin portion 18 are preferably made by slush molding a dry polymer particulate, such as polyvinyl chloride, against a heated mold surface in a manner known in the art. As shown in FIG. 6, an exemplary slush molding method may be accomplished by providing a first polymer composition 42 and a second polymer composition 44, generally both in the form of a powder, in a charge box 46. First and second polymer compositions 42, 44 each comprise at least one polymer and may include additives, such as pigments, stabilizers, plasticizers, etc. First and second polymer compositions 42, 44 are preferably flexible or elastomeric, and may be exactly the same or different. Where first and second polymer compositions 42, 44 are different, it may be with respect to the specific types of polymers (e.g. structure, molecular weight, melt flow index) and/or additives, or the amounts thereof. In addition to polyvinyl chloride, other materials include, but are not limited to, polyurethane (thermoplastic and thermoset), polypropylene and polyethylene, either used solely or with other polymers.

First and second polymer compositions 42, 44 are separated in charge box 46 by a charge box divider panel 48. Charge box 46 is then connected to a mold 50, preferably a nickel electroformed shell mold. Upon joining charge box 46 to mold 50, preferably a gasket 52 attached to divider panel 48 contacts and provides a seal with mold surface 54. In this manner, first and second polymer compositions 42, 44 remain separated during the molding process.

Figure 7:
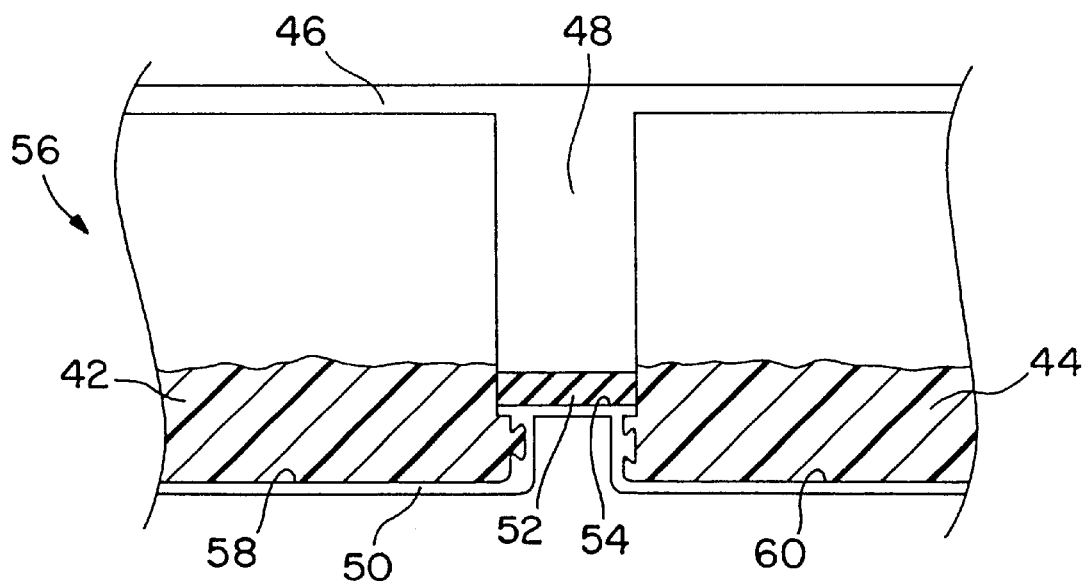
FIG. 7 is a partial cross-sectional view of the shell mold of FIG. 6 inverted during the forming of the skin portions according to the present invention.

As shown in FIG. 7, once charge box 46 and mold 50 are joined, the mold assembly 56 is then rotated to an inverted position such that first and second polymer compositions 42, 44 exit by gravity fall from the charge box 46 onto heated mold surfaces 58, 60. Upon contacting mold surfaces 58, 60, the portion of polymer compositions 42, 44 in contact with mold surfaces 58, 60 is heated and partially fuses to form first and second outer skin portions 16, 18. Mold assembly 56 is then rotated to an unrighted position such that excess unfused first and second polymer compositions 42, 44 return by gravity fall into the charge box 46. Charge box 46 is then disconnected from mold 50 and additional heat is then provided to mold 50 during which time first and second outer skin portions 16, 18 are further fused. Thereafter, mold 50 is cooled and first and second outer skin portions 16, 18 with integral receptacle 26 and protrusion 24 portions are removed from the mold surfaces 58, 60. First and second outer skin portions 16, 18 preferably have a thickness in the range of 1.0 millimeters to 3.5 millimeters.

Figure 8:
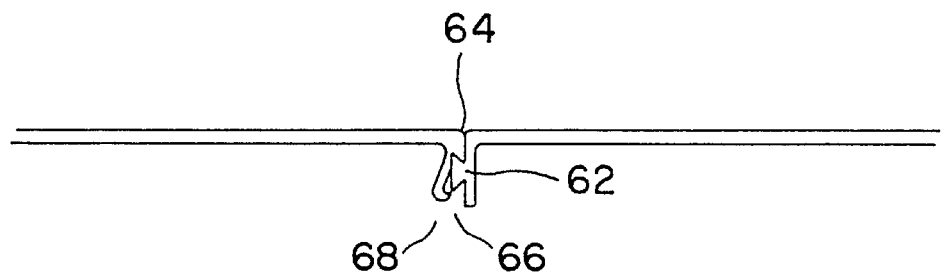
FIG. 8 is a partial cross-sectional view of the skin portions during a method of assembly.

After molding, first and second outer skin portions 16, 18 may be joined by inserting a first portion 62 of shoulder 30 of protrusion 24 into a first portion 64 of recess 34 of receptacle 26 as shown in FIG. 8. A second portion 66 of shoulder 30 of protrusion 24 is then inserted into second portion 68 of recess 34 of receptacle 26 sequentially by rotating second portion 68 of recess 34 into engagement with second portion 66 of shoulder 30. Alternatively, joint 22 may be formed by aligning protrusion 24 and receptacle 26 in sliding arrangement and sliding protrusion 24 and receptacle 26 over one another along their respective lengths to form the joint line 23.

In addition to providing a joining mechanism, the invention also provides for releasable engagement of outer skin portions 16, 18. Before further processing, outer skin portions 16, 18 may have to be separated, for example, because of an improper color combination. If outer skin portions 16, 18 must be separated after joining, outer skin portions 16, 18 may be separated by sliding the protrusion 24 and receptacle 26 apart from one another along their lengths to separate the joint line 23. Alternatively, the joint 22 may be separated by deforming protrusion 24 or receptacle 26 such that protrusion 24 is released from receptacle 26. Generally, when protrusion 24 is removed from receptacle 26 in this manner (i.e. deforming protrusion 24 or receptacle 26), shoulder 33 of receptacle 26 will deform outward expanding the size of receptacle opening 32 such that protrusion 24 may pass through. During separation, protrusion 24, and particularly shoulder 30, may compress and elongate to pass through receptacle opening. However, whether or not protrusion 24 and/or receptacle 26 will deform specifically as described above is generally a function of the specific design and materials used. When protrusion 24 and receptacle 26 separate in the above manner (i.e. deforming protrusion 24 or receptacle 26), damage to the protrusion 24 and/or receptacle 26 is minimal if the deformation occurring during separation substantially occurs within the elastic deformation range of the first and/or second polymer compositions 42, 44. When deformation of the protrusion 24 and receptacle 26 occurs in the elastic deformation range of the first and second polymer compositions 42, 44, respectively, the protrusion 24 and/or receptacle 26 will return substantially to their pre-joining dimensions. Consequently, upon separation, it is possible to reuse the outer skin portions 16, 18, for example, with other outer skin portions of the correct color combinations.

After joining first and second outer skin portions 16, 18, the skin portions 16, 18 are preferably placed in a mold cavity in spaced relationship with the substrate 12. Foam layer 14 is preferably then formed by introducing a foam, or more preferably, a foam precursor material into the mold cavity. Preferably, the foam precursor is a urethane foam precursor which is introduced using a reaction injection molding process known in the art. After the urethane foam precursor is introduced, the reactive constituents, a polyol and isocyanate, begin to react and the subsequently created foam material (generally flexible, semi-rigid or rigid and of a density in the range of 1 lb/ft$^3$ to 15 lb/ft$^3$) flows within the cavity and bonds to outer skin portions 16, 18 and substrate 12. In addition, the adjacent foam layer 14 fortifies joint 22 which further inhibits the joint 22 from separation after the foam molding process.

Preferably, outer skin portion 16 comprises a different color, different texture, or different polymer than outer skin portion 18 which adds to the aesthetic appeal of the vehicle interior. In addition, the above process provides a method of providing outer shell portions independently and joining them thereafter. As opposed to outer shell manufacturing method in which outer skin portions 16, 18 are molded and melt bonded before removal from the shell mold 50 as disclosed in the art, joining outer skin portions 16, 18 after removal from shell mold 50 by the present invention offers several advantages. First, the present invention allows outer skin portions 16, 18 to be molded independently and, if need be, an inventory of separate outer skin portions 16, 18 may be created thus providing outer shell color combination flexibility. Second, since the added complexity of joining the outer shell segments 16, 18 before removal from the shell mold 50 is eliminated, so is the complexity of the mold assembly 56 and process cycle time for providing such an operation. Third, since the outer skin portions 16, 18 are formed independently, the present invention eliminates the post-painting often associated with the joining of outer shell portions 16, 18 before removal from the shell mold 50. For example, outer shell portions 16, 18 joined before removal from the shell mold 50 often must be subsequently painted to conceal defects such as improperly located joint lines or cross-over speckles (i.e. speckles of material which have crossed between charge box 46 chambers). Fourth, since the outer skin portions 16, 18 are formed independently, the present invention makes it possible to join outer skin portions 16, 18 comprising polymers compositions 42, 44 which are incompatible and not generally capable of being bonded in a melt phase. Fifth, since the outer skin portions 16, 18 are formed independently, the present invention makes it possible to join outer skin portions 16, 18 with different molding shrinkage values, thus eliminating the difficulty of having to construct a shell mold 50 to facilitate such. Sixth, since the outer skin portions 16, 18 are formed independently, the present invention makes it possible to join outer skin portions 16, 18 with different melt temperatures, thus eliminating the difficulty of having to process such materials without changing molding conditions. Seventh, since the outer skin portions 16, 18 are slidably engaged, the present invention makes it possible to join outer skin portions with different coefficients of lineal thermal expansion. Generally, when outer skin portions 16, 18 with different coefficients of linear thermal expansion are fixedly attached and the joint surfaces are unable to move independent of one another, the outer skin portions 16, 18 surrounding the joint tend to exhibit wrinkles when exposed to extreme temperature conditions, such as −40° F. to 250° F. While providing engagement outward from trim panel 10, the invention still permits the outer skin portions 16, 18 to move side-to-side relative to one another along the joint line 23. Lastly, the joint 22 is concealed from view of the vehicle occupant which makes it aesthetically pleasing to the vehicle occupant.

The above description to illustrate embodiments of the present invention uses descriptive rather than limiting words. Obviously, there are many ways that one might modify these embodiments while remaining within the scope of the claims. In other words, there are many other ways that one may practice the present invention without exceeding the scope of the claims herein.

For example, in various embodiments interior trim panel 10 may include, but is not limited to, instrument panels, side trim panels (e.g. door trim panels, quarter trim panels), floor consoles, headliners, overhead consoles, package shelves, parcel trays, seats, close-out panels, glove box doors, armrests, knee bolsters, steering column covers, and pillar covers. In various embodiments, outer skin portions 16, 18 may be produced by, but not limited to, injection molding, vacuum forming, rotational molding, spray coating and casting. In various embodiments, rather than receptacle 26 and protrusion 24 being formed at the same time with the outer skin portions 16, 18, receptacle 26 and/or protrusion 24 may be formed separate from the outer skin portions 16, 18 and joined to the outer skin portions 16, 18 either during or after forming of the outer skin portions 16, 18.

I claim:

1. An automotive interior trim panel comprising:
    a first flexible outer skin portion comprising a first polymer material composition, said first skin portion further comprising a receptacle formed substantially parallel to a first skin outer surface;
    a second flexible outer skin portion comprising a second polymer material composition, said second skin portion further comprising a protrusion formed substantially parallel to a second skin inner surface;
    wherein said receptacle is configured to receive said protrusion, whereby an interlocking joint may be formed between said first skin portion and said second skin portion providing a generally continuous surface including said first skin outer surface and an outer surface of said second skin portion.

2. The trim panel according to claim 1 wherein said protrusion comprises a flared tenon and said receptacle comprises an undercut mortise.

3. The trim panel according to claim 1 wherein said protrusion comprises a bead and said receptacle comprises a socket.

4. The trim panel according to claim 1 wherein said first polymer material composition is the same as the second polymer material composition.

5. The trim panel according to claim 1 wherein said first polymer material composition is different than the second polymer material composition.

6. The trim panel according to claim 1 wherein said first skin portion is the same color as the second skin portion.

7. The trim panel according to claim 1 wherein said first skin portion is a different color than said second skin portion.

8. The trim panel according to claim 1 wherein said first skin portion has the same texture as the second skin portion.

9. The trim panel according to claim 1 wherein said first skin portion has a different texture than the second skin portion.

10. The trim panel according to claim 1 further comprising a foam material disposed adjacent to said first skin portion and said second skin portion.

11. A method of forming an automotive trim panel comprising:
    providing a first flexible skin portion having a receptacle formed substantially parallel to a first skin outer surface;
    providing a second flexible outer skin portion having a protrusion formed substantially parallel with a second skin inner surface, wherein said protrusion is configured to be received in said receptacle;
    introducing at least a portion of said protrusion into at least a portion of said receptacle, whereby a mechanical engagement is achieved providing a trim panel having a generally continuous outer surface including first skin portion and the second skin portion.

12. The method according to claim 11 further comprising providing a foam material adjacent to an inner surface of said first skin portion and said inner surface of said second skin portion.

* * * * *